US008982128B2

(12) United States Patent
Kim et al.

(10) Patent No.: US 8,982,128 B2
(45) Date of Patent: Mar. 17, 2015

(54) METHOD OF PROVIDING IMAGE AND DISPLAY APPARATUS APPLYING THE SAME

(71) Applicant: Samsung Electronics Co., Ltd., Suwon-si (KR)

(72) Inventors: Hyo-dae Kim, Suwon-si (KR); Myung-suk Bae, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 13/688,371

(22) Filed: Nov. 29, 2012

(65) Prior Publication Data

US 2013/0155067 A1   Jun. 20, 2013

(30) Foreign Application Priority Data

Dec. 15, 2011   (KR) .................. 10-2011-0135485

(51) Int. Cl.
  *G06T 17/00*   (2006.01)
  *G09G 5/391*   (2006.01)
  *H04N 21/41*   (2011.01)
  *H04N 21/4363*   (2011.01)
  *H04N 21/4402*   (2011.01)
  *H04N 21/462*   (2011.01)

(52) U.S. Cl.
  CPC ............ *G09G 5/391* (2013.01); *H04N 21/4126* (2013.01); *H04N 21/43637* (2013.01); *H04N 21/440263* (2013.01); *H04N 21/4621* (2013.01)
  USPC .............................. 345/428; 345/1.2; 345/660

(58) Field of Classification Search
  USPC ............................. 345/428, 1.2, 660; 375/295
  See application file for complete search history.

(56) References Cited

U.S. PATENT DOCUMENTS

| | | | |
|---|---|---|---|
| 6,345,279 B1 * | 2/2002 | Li et al. ................................. | 1/1 |
| 6,564,262 B1 | 5/2003 | Chaddha | |
| 2002/0016818 A1 * | 2/2002 | Kirani et al. ................... | 709/203 |
| 2004/0073873 A1 * | 4/2004 | Croney et al. ................. | 715/526 |
| 2006/0153373 A1 * | 7/2006 | Mukherjee ....................... | 380/42 |
| 2007/0280646 A1 | 12/2007 | Seita et al. | |
| 2008/0201748 A1 * | 8/2008 | Hasek et al. .................... | 725/98 |
| 2010/0223649 A1 * | 9/2010 | Suitts et al. ................... | 725/105 |

FOREIGN PATENT DOCUMENTS

| | | |
|---|---|---|
| EP | 1 367 734 A1 | 12/2003 |
| EP | 1 725 037 A2 | 11/2006 |
| EP | 2 355 506 A1 | 8/2011 |

OTHER PUBLICATIONS

Communication dated Mar. 4, 2013, issued by the European Patent Office in counterpart European Patent Application No. 12196040.5.

* cited by examiner

*Primary Examiner* — Maurice L McDowell, Jr.
(74) *Attorney, Agent, or Firm* — Sughrue Mion, PLLC

(57) ABSTRACT

A method of providing an image and a display apparatus applying the same are provided. The method of providing an image of a display apparatus includes receiving signals requesting images having different resolutions from each other from a plurality of mobile apparatuses, determining a resolution reproducible by all of the plurality of mobile apparatuses among a plurality of resolutions requested from the plurality of mobile apparatuses as a first resolution and processing the image to be provided to the plurality of mobile apparatuses with the first resolution, and transmitting the image having the first resolution to the plurality of mobile apparatuses.

23 Claims, 5 Drawing Sheets

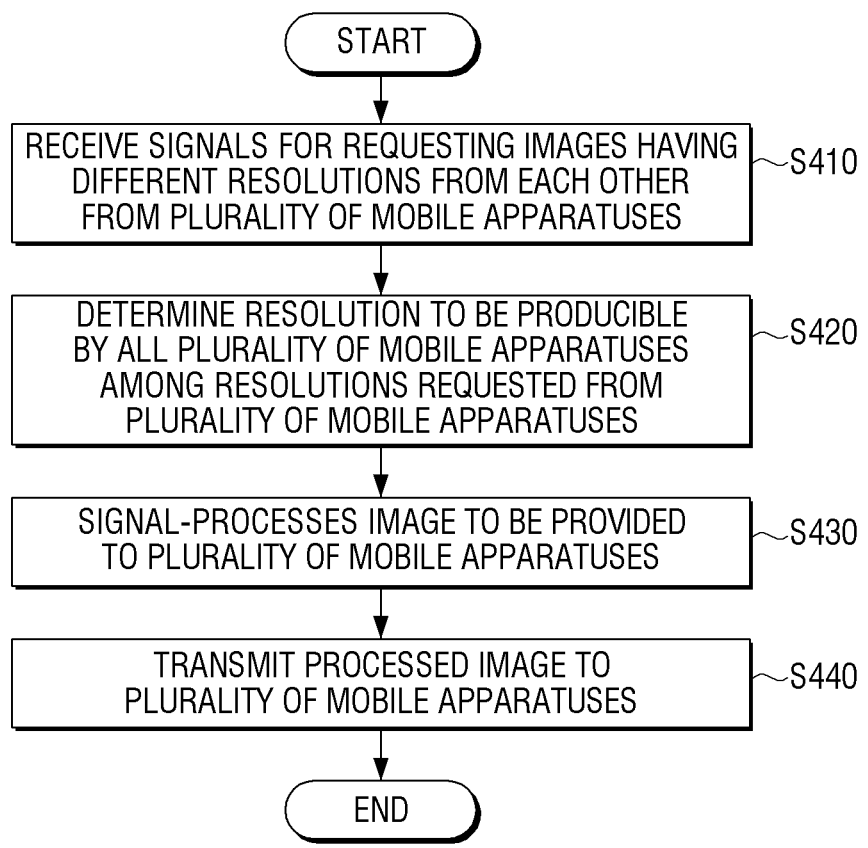

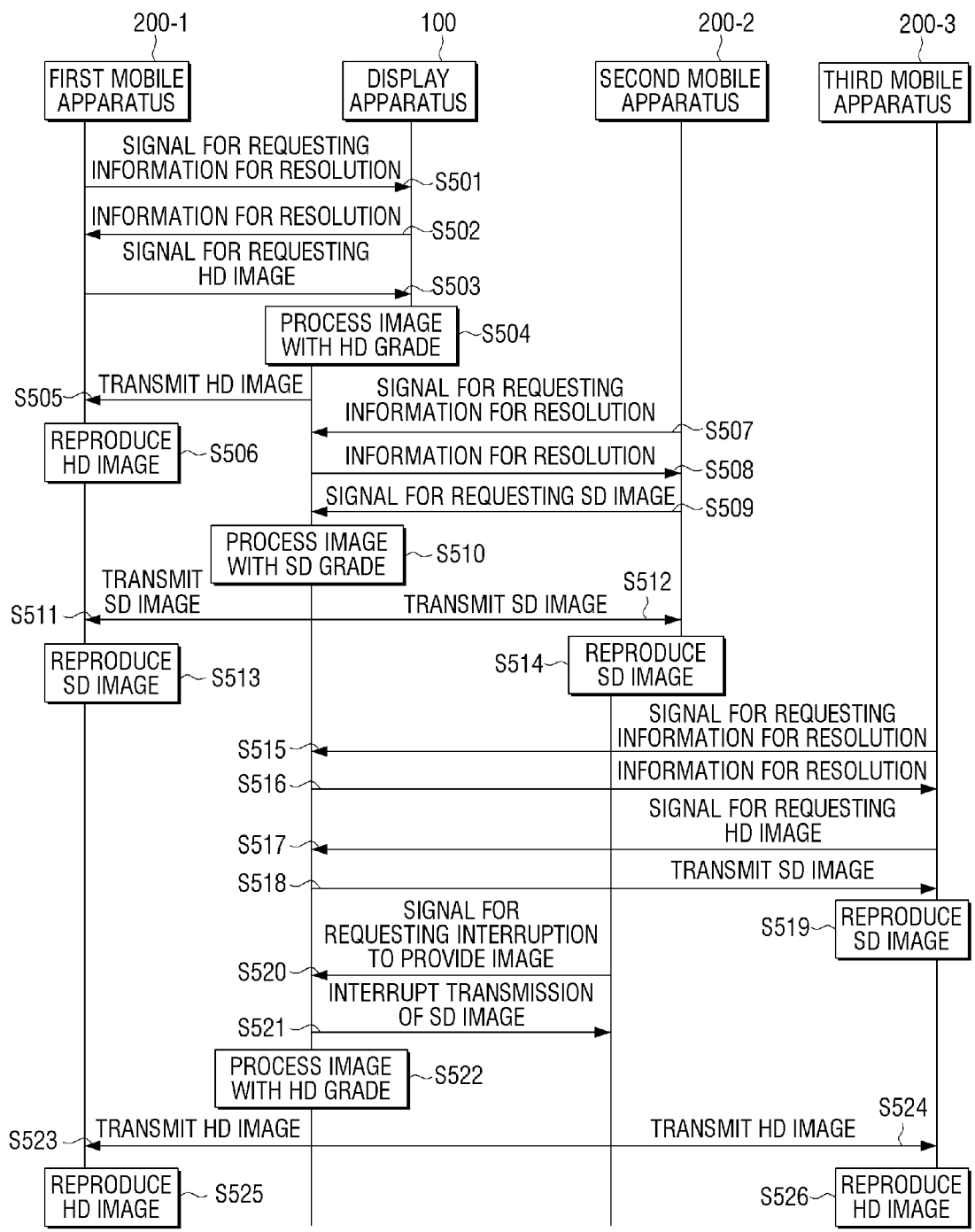

METHOD OF PROVIDING IMAGE AND DISPLAY APPARATUS APPLYING THE SAME

CROSS-REFERENCE TO RELATED APPLICATION

This application claims priority from Korean Patent Application No. 10-2011-0135485, filed on Dec. 15, 2011, in the Korean Intellectual Property Office, the disclosure of which is incorporated herein by reference in its entirety.

BACKGROUND

1. Field

Apparatuses and methods consistent with exemplary embodiments relate to a method of providing an image and a display apparatus applying the same, and more particularly, to a method of providing an image in real time to a mobile apparatus by a display apparatus and a display apparatus applying the same.

2. Description of the Related Art

In recent years, a display apparatus enables a user to watch an image displayed therein through a mobile apparatus by streaming image data in real time to the mobile apparatus.

In addition, the display apparatus enables the transmission of image data to a plurality of mobile apparatuses. In particular, when the display apparatus is provided with only one encoder configured to transmit an image to the plurality of mobile apparatuses, the display apparatus processes the image to be provided to the plurality of mobile apparatuses with a single resolution and provides the images having the same resolution to the plurality of mobile apparatuses.

When requests for image provision are received from the plurality of the mobile apparatuses which reproduce images with different resolutions, it is impossible for the display apparatus to provide desired images to all of the plurality of mobile apparatuses.

For example, when a request for standard definition (SD) image provision is received from a first mobile apparatus, a display apparatus processes an image to be transmitted to the first mobile apparatus with an SD-graded resolution and transmits the processed image to the first mobile apparatus. Then, when a request for high-definition (HD) image provision is received from a second mobile apparatus, the display apparatus processes an image to be transmitted to the first and second mobile apparatuses with an HD-graded resolution and transmits the processed images to the first and second mobile apparatuses. However, since the first mobile apparatus can reproduce only an SD image, the first mobile apparatus degrades the HD-graded image. Alternatively, when the request for HD image provision is received from the second mobile apparatus, the display apparatus may continue to transmit the image having the SD-graded resolution to the first mobile apparatuses and reject the request for image provision from the second mobile apparatus.

Accordingly, there is a need for a method of reproducing an image through all the plurality of mobile apparatuses having different resolutions when requests for image provision are received from the plurality of the mobile apparatuses.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided a method which provides an image by determining a first resolution, among a plurality of resolutions requested by a plurality of mobile apparatuses, reproducible by all of the plurality of mobile apparatuses, processing the image to be provided to the plurality of mobile apparatuses with the first resolution, and transmitting the image having the first resolution to the plurality of mobile apparatuses, and a display apparatus applying the same.

According to an aspect of another exemplary embodiment, there is provided a method which provides an image displayed by a display apparatus. The method may include: receiving signals requesting images of different resolutions from each other from a plurality of mobile apparatuses; determining a first resolution reproducible by all of the plurality of mobile apparatuses among a plurality of resolutions requested from the plurality of mobile apparatuses and processing the image to be provided to the plurality of mobile apparatuses with the first resolution; and transmitting the image having the first resolution to the plurality of mobile apparatuses.

The method may further include: receiving a signal requesting an image having a second resolution from a mobile apparatus other than the plurality of mobile apparatuses; processing the image to be provided to the plurality of mobile apparatuses and the other mobile apparatus with the second resolution when the first resolution is higher than the second resolution; and transmitting the image having the second resolution to the plurality of mobile apparatuses and the other mobile apparatus.

The method may further include: processing the image to be provided to the plurality of mobile apparatuses and the other mobile apparatus with the first resolution when the first resolution is lower than the second resolution; and transmitting the image having the first resolution to the plurality of mobile apparatuses and the other mobile apparatuses.

The method may further include: receiving a signal requesting interruption of the transmitting of the image from one of the plurality of mobile apparatuses; processing the image to be provided to remaining ones of the plurality of mobile apparatuses with a third resolution when the lowest resolution among resolutions requested from the remaining ones of the plurality of mobile apparatuses other than the one mobile apparatus is changed into the third resolution; and transmitting the image having the third resolution to the remaining ones of the plurality of mobile apparatuses.

The processing may include designating video data constituting the image to be provided to the plurality of mobile apparatuses as a scale corresponding to the first resolution; and compressing the video data and audio data constituting the image to be provided to the plurality of mobile apparatuses and inserting information about the first resolution into additional information to generate a transport stream.

The method may further include storing information of resolutions requested from the plurality of mobile apparatuses in a resolution list.

The receiving may include receiving a signal requesting information of resolutions provided by the display apparatus from the plurality of mobile apparatuses; transmitting the information about the resolutions provided by the display apparatus to the plurality of mobile apparatuses; and receiving a signal requesting the image having one resolution among the resolutions from each of the plurality of mobile apparatuses.

According to another aspect of an exemplary embodiment, there is provided a display apparatus. The display apparatus may include: a communication unit configured to communicate with a plurality of mobile apparatuses; an image processing unit configured to process the image to be transmitted to the plurality of mobile apparatuses; a control unit configured to, when signals requesting images having different resolutions from each other are received from the plurality of mobile apparatuses, determine a first resolution reproducible by all the plurality of mobile apparatuses among a plurality of resolutions requested from the plurality of mobile apparatuses, process the image to be provided to the plurality of mobile apparatuses with the first resolution, and control the communication unit to transmit the image having the first resolution to the plurality of mobile apparatuses.

The control unit may compare the first resolution with a second resolution when a signal requesting an image having the second resolution is received from an additional mobile apparatus other than the plurality of mobile apparatuses, process the image to be provided to the plurality of mobile apparatuses and the additional mobile apparatus with the second resolution when the first resolution is higher than the second resolution, and control the communication unit to transmit the image having the second resolution to the plurality of mobile apparatuses and the additional mobile apparatus.

The control unit may process the image to be provided to the plurality of mobile apparatuses and the additional mobile apparatus with the first resolution when the first resolution is lower than the second resolution, and control the communication unit to transmit the image having the first resolution to the plurality of mobile apparatuses and the additional mobile apparatus.

The control unit may, when a signal for interrupting the transmitting of the image is received from one of the plurality of mobile apparatuses, and the lowest resolution among resolutions requested by remaining ones of the plurality of mobile apparatuses other than the one mobile apparatus is changed into a third resolution, process the image to be transmitted to the remaining ones of the plurality of mobile apparatuses other than the one mobile apparatus, and control the communication unit to transmit the image having the third resolution to the remaining ones of the plurality of mobile apparatuses other than the one mobile apparatus.

The image processing unit may include a scaler configured to designate video data constituting the image to be transmitted to the plurality of mobile apparatuses as a scale corresponding to the first resolution; and an encoding unit configured to compress the video data and audio data constituting the image to be transmitted to the plurality of mobile apparatuses, and insert information about the first resolution into additional information to generate a transport stream.

The display apparatus may further include a storage unit configured to store information of the different resolutions requested from the plurality of mobile apparatuses as a resolution list.

The communication unit may, when a signal requesting information about resolutions provided by the display apparatus is received from the plurality of mobile apparatuses, transmit the information about the resolutions provided by the display apparatus to the plurality of mobile apparatuses, and receive a signal requesting the image having one resolution among the resolutions provided by the display apparatus from each of the plurality of mobile apparatuses.

According to another aspect of an exemplary embodiment, there is provided a method of providing an image of a display apparatus. The method may include: receiving a first signal requesting an image having a first resolution from a first mobile apparatus; processing the image to be transmitted to the first mobile apparatus with the first resolution; transmitting the image processed with the first resolution to the first mobile apparatus; receiving a second signal requesting an image having a second resolution lower than the first resolution from a second mobile apparatus; processing the image to be transmitted to the first mobile apparatus and the second mobile apparatus with the second resolution; and transmitting the image processed with the second resolution to the first mobile apparatus and to the second mobile apparatus.

The method may further include: receiving a third signal requesting an image having the first resolution from a third mobile apparatus; and transmitting the image processed with the second resolution to the first mobile apparatus, the second mobile apparatus, and the third mobile apparatus.

The method may further include: interrupting the transmitting of the image processed with the second resolution to the second mobile apparatus when a signal for interruption of the transmitting of the image is received from the second mobile apparatus; processing the image to be provided to the first mobile apparatus and the third apparatus with the first resolution; and transmitting the image processed with the first resolution to the first mobile apparatus and to the second mobile apparatus.

The method may further include: when the signal requesting the image having the first resolution from the first mobile apparatus is received, mapping the first mobile apparatus with the first resolution and storing the mapping result; and when the signal requesting the image having the second resolution from the second mobile apparatus is received, mapping the second mobile apparatus with the second resolution and storing the mapping result.

According to another aspect of an exemplary embodiment, there is provided a method of providing an image of a mobile apparatus. The method may include: receiving a signal requesting the image having a first resolution from a first display apparatus; processing the image to be transmitted to the first display apparatus with the first resolution; transmitting the image processed with the first resolution to the first display apparatus; receiving another signal requesting the image having a second resolution lower than the first resolution from a second display apparatus; processing the image to be provided to the first mobile apparatus and to the second mobile apparatus with the second resolution; and transmitting the image processed with the second resolution to the first display apparatus and to the second display apparatus.

The method may further include: receiving a signal requesting an image having the first resolution from a third display apparatus; and transmitting the image processed with the second resolution to the first display apparatus, the second display apparatus, and the third display apparatus.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which:

FIG. 4 is a flowchart illustrating a method of providing an image of a display apparatus according to an exemplary embodiment; and FIG. 5 is a flowchart illustrating a method of providing an image of an image providing system according to an exemplary embodiment.

DETAILED DESCRIPTION OF THE EXEMPLARY EMBODIMENTS

Figure 1:
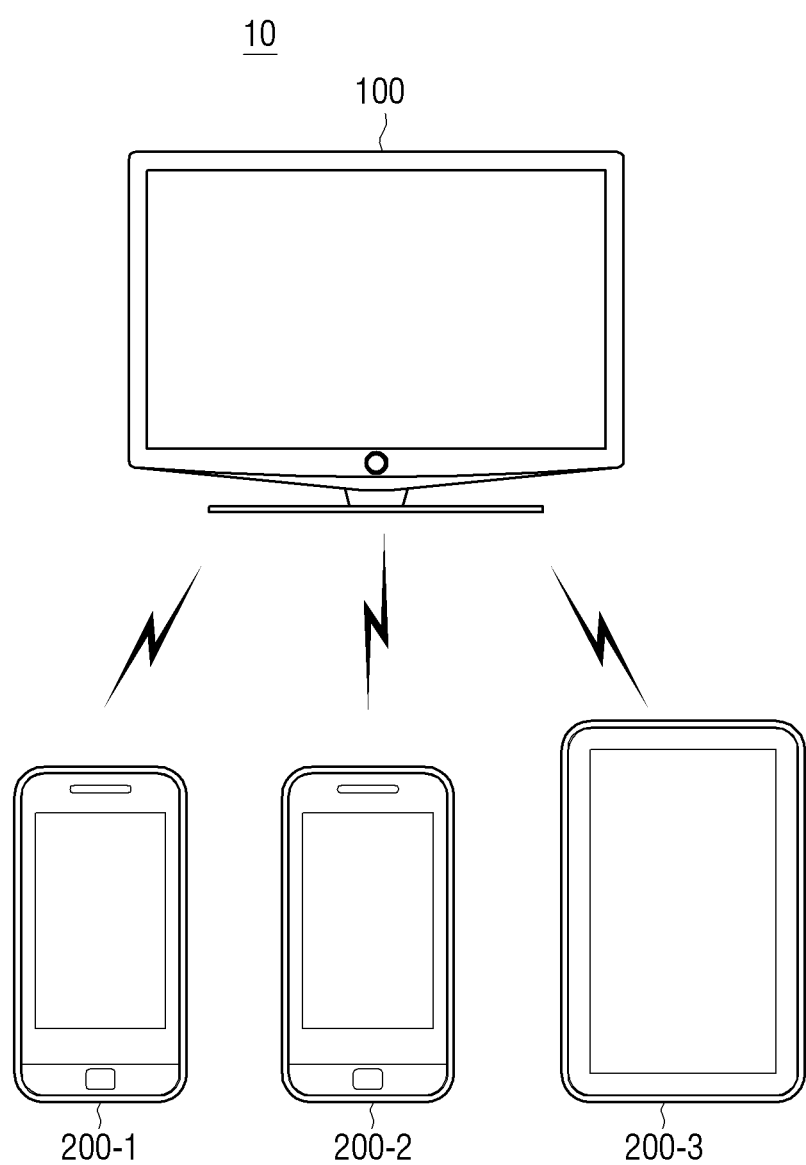
FIG. 1 is a view illustrating an image providing system including a display apparatus and a plurality of mobile apparatuses according to an exemplary embodiment.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating an image providing system including a display apparatus and a plurality of mobile apparatuses according to an exemplary embodiment. As shown in FIG. 1, the image providing system 10 includes a display apparatus 100 configured to provide an image and a plurality of mobile apparatuses 200-1, 200-2, and 200-3 configured to reproduce an image transmitted from the display apparatus 100. The display apparatus 100 may be implemented with a television (TV), a monitor, a projection TV, or the like. The mobile apparatuses 200-1, 200-2, and 200-3 may be implemented with a mobile phone, a tablet personal computer (PC), a laptop PC, a personal digital assistant (PDA), a remote controller, or the like.

The display apparatus 100 receives an image from various external sources (for example, a broadcasting station, a digital versatile disc (DVD)). The display apparatus 100 processes the image input from the outside and transmits the processed image to the plurality of mobile apparatuses 200-1, 200-2, and 200-3.

Specifically, when a signal requesting information of a resolution provided by the display apparatus 100 is received from each of the plurality of mobile apparatuses 200-1, 200-2, 200-3, the display apparatus 100 transmits the information about the resolution provided by the display apparatus 100 to the plurality of mobile apparatuses 200-1, 200-2, and 200-3. For example, the display apparatus 100 transmits information, in which the display apparatus 100 is capable of providing a 480 P-graded SD image, a 720 P-graded HP image, and a 1080 P-graded HP image, to the plurality of mobile apparatuses 200-1, 200-2, and 200-3.

Then, the display apparatus 100 receives a signal requesting an image having one resolution among the resolutions provided by the display apparatus 100 from each of the plurality of mobile apparatuses 200-1, 200-2, and 200-3. For example, the display apparatus 100 may receive a signal requesting an image having a first resolution (for example, an SD image) from the first mobile apparatus 200-1 and a signal requesting the image having a second resolution (for example, an HD image) from the second mobile apparatus 200-2.

In particular, when signals requesting images of different resolutions are received from the plurality of mobile apparatuses 200-1, 200-2, and 200-3, the display apparatus 100 determines the first resolution which is to be reproducible by all of the plurality of mobile apparatuses 200-1, 200-2, and 200-3 among a plurality of resolutions required from the plurality of mobile apparatuses 200-1, 200-2, and 200-3, and processes the image to be transmitted to the plurality of the mobile apparatuses 200-1, 200-2, and 200-3 with the first resolution.

Specifically, when the signal requesting an SD image is received from the first mobile apparatus 200-1, the signal requesting an HD image is received from the second mobile apparatus 200-2, and the signal requesting an HD image is received from the third mobile apparatus 200-3, the display apparatus 100 maps the plurality of resolutions requested from the plurality of mobile apparatuses 200-1, 200-2, and 200-3 with the plurality of mobile apparatuses 200-1, 200-2, and 200-3, respectively and stores the mapping results in a resolution list.

The display apparatus 100 analyzes the plurality of stored resolutions and determines a resolution reproducible by all of the mobile apparatuses 200-1, 200-2, and 200-3. That is, when the first mobile apparatus 200-1 requests the SD image and the second and third mobile apparatuses 200-2 and 200-3 request the HD images, the display apparatus 100 determines the resolution reproducible by the first, second, and third mobile apparatuses 200-1, 200-2, and 200-3 as the SD image. Therefore, the display apparatus 100 processes the image input from the outside as an SD-graded image. The method of processing the image will be described with reference to FIG. 2 below.

The display apparatus 100 transmits the processed image to the plurality of mobile apparatuses 200-1, 200-2, and 200-3.

Meanwhile, the display apparatus 100 may receive a signal requesting an image having the second resolution from an additional mobile apparatus other than the plurality of mobile apparatuses 200-1, 200-2, and 200-3.

At this time, the display apparatus 100 compares the first resolution provided to the plurality of mobile apparatuses 200-1, 200-2, and 200-3 with the second resolution. When the first resolution is higher than the second resolution, the display apparatus 100 processes the image to be provided to the plurality of mobile apparatuses and the additional mobile apparatus with the second resolution and transmits the processed image to the plurality of mobile apparatuses 200-1, 200-2, and 200-3 and the additional mobile apparatus.

When the first resolution is equal to or lower than the second resolution, the display apparatus 100 processes the image to be provided to the plurality of mobile apparatuses 200-1, 200-2, and 200-3 and the additional mobile apparatus with the first resolution and transmits the processed image to the plurality of mobile apparatuses 200-1, 200-2, and 200-3 and the additional mobile apparatus.

The display apparatus 100 may receive a signal requesting interruption of the transmitting of the image from one of the plurality of mobile apparatuses 200-1, 200-2, and 200-3.

When the lowest resolution among resolutions requested by remaining ones of the plurality of mobile apparatuses other than the one mobile apparatus is changed into a third resolution, the display apparatus 100 processes the image to be provided to the remaining ones of the plurality of mobile apparatuses other than the one mobile apparatus with the third resolution. The display apparatus 100 may transmit the image having the third resolution to the remaining ones of the plurality of mobile apparatuses other than the one mobile apparatus.

Each of the mobile apparatuses 200-1, 200-2, and 200-3 transmits a signal requesting information about a resolution provided by the display apparatus 100 to the display apparatus 100. When the information about the resolution provided by the display apparatus 100 is received from the display apparatus 100, each of the mobile apparatuses 200-1, 200-2, and 200-3 requests the image having a resolution reproducible by each of the plurality of mobile apparatuses 200-1, 200-2, and 200-3 to the display apparatus 100. At this time, the image having the resolution reproducible by each of the plurality of mobile apparatuses 200-1, 200-2, and 200-3 may be determined according to hardware and/or software of each of the mobile apparatuses 200-1, 200-2, 200-3 as well as conditions of a wireless mobile communication.

When each of the mobile apparatuses 200-1, 200-2, and 200-3 receives an image having a specific resolution from the display apparatus 100, each of the mobile apparatuses processes the transmitted image and displays the processed image.

When the resolution of the image which is transmitting is changed due to the addition or withdrawal of another mobile apparatus while the image having the first resolution is transmitted from the display apparatus 100, each of the mobile apparatuses 200-1, 200-2, and 200-3 receives the image having the changed resolution and displays the received image.

By the above-described image providing system 10, the users of the mobile apparatuses are capable of watching the image provided from one display apparatus through the plurality of mobile apparatuses.

Hereinafter, the display apparatus 100 and the mobile apparatuses 200-1, 200-2, and 200-3 constituting the image providing system 10 will be described in more detail with reference to FIGS. 2 and 3.

Figure 2:
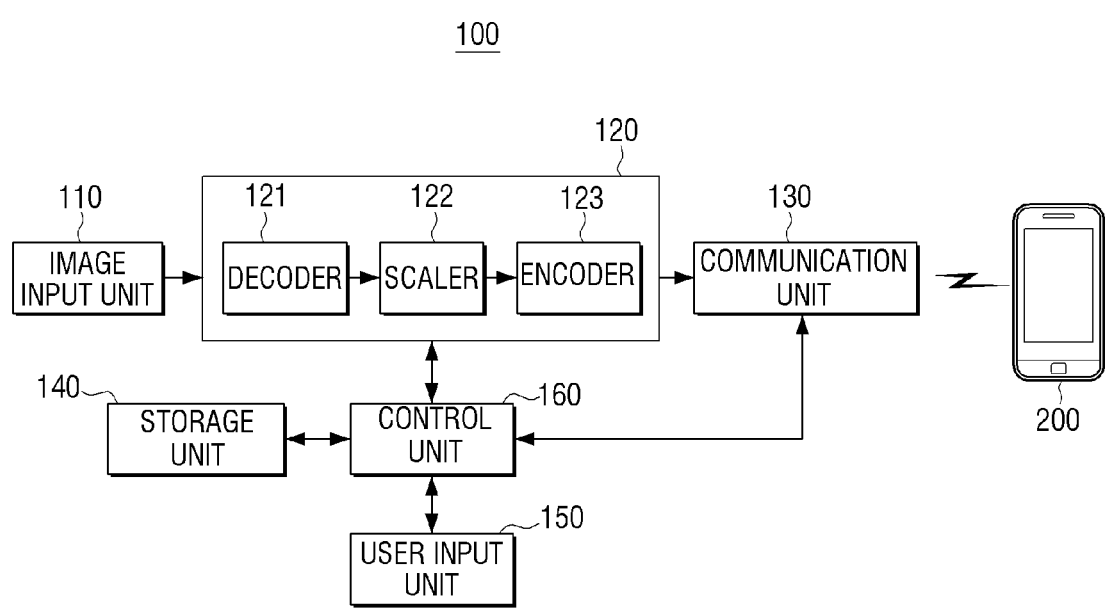
FIG. 2 is a block diagram illustrating a configuration of a display apparatus according to an exemplary embodiment.

FIG. 2 is a block diagram illustrating a configuration of the display apparatus 100 according to an exemplary embodiment. As shown in FIG. 2, the display apparatus 100 includes an image input unit 110, an image processing unit 120, a communication unit 130, a storage unit 140, a user input unit 150, and a control unit 160.

The image input unit 110 receives an image from various external sources. Specifically, the image input unit 110 may receive a broadcasting image from a broadcasting station, receive image contents from external input apparatuses (for example, DVD, or the like), and an image through an Internet network.

The image processing unit 120 processes the received image from the outside to an image to be provided to the plurality of mobile apparatuses. Specifically, the image processing unit 120 includes a decoder 121, a scaler 122, and an encoder 123. The decoder 121 separates the image received from the outside into audio data, video data, and synchronization control information through a demultiplexer (not shown) and decodes the separated audio data, video data, and synchronization control information. The scaler 122 designates a scale of decoded video data corresponding to a resolution of an image to be transmitted to the mobile apparatus. The encoder 123 compresses the video data and audio data and inserts additional information data and the synchronization control information into the compressed result to generate a transport stream. At this time, resolution information is added to the additional information data.

The communication unit 130 performs communication with the plurality of mobile apparatuses. In particular, the communication unit 130 transmits the transport stream generated in the image processing unit 120 to the plurality of mobile apparatuses. The communication unit 130 may receive a signal requesting information about a resolution supportable by the display apparatus 100 and a signal requesting an image.

The communication unit 130 may be implemented with wireless fidelity (Wi-Fi), Ethernet, or the like.

The storage unit 140 stores various kinds of data and programs for controlling the display apparatus 100. In particular, the storage unit 140 may map the resolution required by at least one of the mobile apparatuses with the at least one mobile apparatuses and store the mapping result in a list type.

The user input unit 150 receives a user command. The user input unit 150 may be implemented with a remote controller, a touch screen, and the like, but the user input unit 150 is not limited thereto.

The control unit 160 controls an entire display apparatus 100 according to the user command input through the user input unit 150. In particular, when signals requesting images having different resolutions from each other are received from the plurality of mobile apparatuses, the control unit 160 determines a first resolution reproducible by all the plurality of mobile apparatuses among a plurality of resolutions required from the plurality of mobile apparatuses and controls the image processing unit 120 to process the image to be provided to the plurality of mobile apparatuses with the first resolution. In addition, the control unit 160 controls the communication unit 130 to transmit the image having the first resolution to the plurality of mobile apparatuses.

Specifically, when the signal requesting the information about the resolution provided by the display apparatus 100 is received from the plurality of mobile apparatuses 200-1, 200-2, and 2003, the control unit 160 controls the communication unit 130 to transmit the information about the resolution provided by the display apparatus to the plurality of mobile apparatuses 200-1, 200-2, and 200-3. For example, the display apparatus 100 may transmit information in which a 480 P-graded SD image, a 720 P-graded HD image, and a 1080 P-graded HD image are provided by the display apparatus 100 to the plurality of mobile apparatuses 200-1, 200-2, and 200-3.

The control unit 160 receives a signal requesting an image having one among the resolutions provided by the display apparatus 100 from each of the plurality of mobile apparatuses 200-1, 200-2, and 200-3 through the communication unit 130. For example, the display apparatus 100 may receive a signal requesting an image having the first resolution (for example, the 480 P-graded SD image) from the first mobile apparatus 200-1, a signal requesting an image having the second resolution (for example, the 720 P-graded HD image) from the second mobile apparatus 200-2, and a signal requesting an image having the third resolution (for example, the 1080 P-graded HD image) from the third mobile apparatus 200-3.

In particular, when the signals requesting images having different resolutions from each other are received from the plurality of mobile apparatuses 200-1, 200-2, and 200-3, the control unit 160 determines the first resolution reproducible by all of the plurality of mobile apparatuses 200-1, 200-2, and 200-3 among the plurality of resolutions requested by the plurality of mobile apparatuses 200-1, 200-2, and 200-3, and processes the image to be transmitted to the plurality of mobile apparatuses 200-1, 200-2, and 200-3 with the first resolution.

For example, when the signal requesting an SD image is received from the first mobile apparatus 200-1, the signal requesting an HD signal is received from the second mobile apparatus 200-2, and the signal requesting an HD image is received from the third mobile apparatus 200-3, the control unit 160 analyzes the plurality of resolutions requested from the plurality of mobile apparatuses 200-1, 200-2, and 200-3 and determines the resolution reproducible by all the mobile apparatuses 200-1, 200-2, and 200-3. At this time, the resolution reproducible by all of the mobile apparatuses 200-1, 200-2, and 200-3 may be the lowest resolution among the resolutions requested by the plurality of mobile apparatuses 200-1, 200-2, and 200-3.

For example, when the first mobile apparatus 200-1 requests an SD image and the second and third mobile apparatuses 200-2 and 200-3 request HD images, the control unit 160 determines the image reproducible by all of the mobile apparatuses as the SD image.

In addition, the control unit 160 controls the image processing unit 120 to process the image input from the image input unit 110 with an SD grade. Specifically, the control unit 160 designates a scale of the image to be transmitted to the plurality of mobile apparatuses 200-1, 200-2, and 200-3 through the scaler 122 as a scale of 720×480. The control unit 160 controls the encoder 123 to insert additional information (the 480 P-graded SD image) for the resolution into the transport stream.

The control unit 160 transmits the processed image to the plurality of mobile apparatuses 200-1, 200-2, and 200-3 through the communication unit 130.

In addition, when the signal requesting an image having the second resolution is received from an additional apparatus, other than the plurality of mobile apparatuses, through the communication unit 130, the control unit 160 compares the first resolution previously provided to the plurality of mobile apparatuses with the second resolution requested by the additional apparatus.

Specifically, when the first resolution is higher than the second resolution, the control unit 160 may process the image to be provided to the plurality of mobile apparatuses and the additional mobile apparatus with the second resolution and transmit the processed image to the plurality of mobile apparatuses and the additional mobile apparatus. For example, when the image of the first resolution provided to the plurality of mobile apparatuses is a 720 P-graded HD image and the image of the second resolution requested from the additional mobile apparatus is a 480 P-graded SD image, the control unit 160 may process the image to be provided to the plurality of mobile apparatuses and the additional mobile apparatus with the 480 P-graded SD image and transmit the processed image to the plurality of mobile apparatuses and the additional mobile apparatus.

Meanwhile, when the first resolution is equal to or lower than the second resolution, the control unit 160 may process the image to be provided to the plurality of mobile apparatuses and the additional mobile apparatus with the first resolution and transmit the processed signal to the plurality of mobile apparatuses and the additional mobile apparatus. For example, when an image of the first resolution provided to the plurality of mobile apparatuses is a 720 P-graded HD image and an image of the second resolution requested from the additional apparatus is a 1080 P-graded HD image, the control unit 160 may process the image to be provided to the plurality of mobile apparatuses and the additional mobile apparatus with the 720 P-graded HD image and transmit the processed image to the plurality of mobile apparatuses and the additional apparatus.

In addition, when a signal requesting interruption of the transmitting of the image from one of the plurality of mobile apparatuses having the third resolution is received, the control unit 160 determines whether or not the lowest resolution among resolutions requested by remaining ones of the plurality of mobile apparatuses other than the one mobile apparatus is changed from the first resolution to the third resolution.

At this time, when the lowest resolution among the resolutions requested by the remaining one of the plurality of mobile apparatuses other than the one mobile apparatus is changed from the first resolution to the third resolution, the control unit 160 processes the image to be provided to the remaining ones of the plurality of mobile apparatuses other than one mobile apparatus with the third resolution. The display apparatus 100 may transmit the image having the third resolution to the remaining ones of the plurality of mobile apparatuses other than the one mobile apparatus. For example, when the image having the resolution provided to the first to third mobile apparatuses 200-1, 200-2, and 200-3 is a 480 P-graded SD image, if the signal requesting interruption of the transmitting of the image from the first mobile apparatus 200-1 which requests the 480 P-graded SD image, the control unit 160 may process the image with the lowest resolution among the resolutions requested by remaining second and third mobile apparatuses 200-2 and 200-3 other than the first mobile apparatus 200-1 and transmit the processed image to the second and third mobile apparatuses 200-2 and 200-3.

By the above-described display apparatus 100, the users of the mobile apparatuses are capable of watching the image provided from the display apparatus through the plurality of mobile apparatuses.

Figure 3:
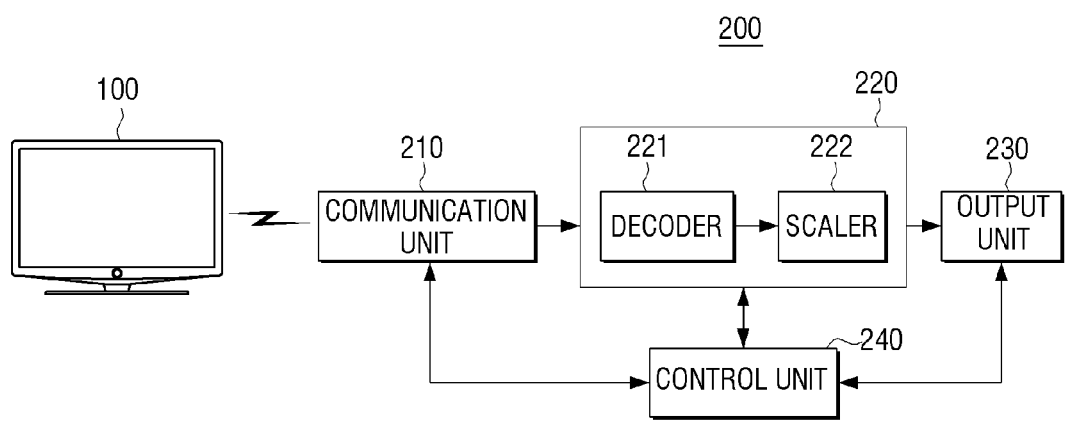
FIG. 3 is a block diagram of a configuration of a mobile apparatus according to an exemplary embodiment.

FIG. 3 is a block diagram illustrating a configuration of a mobile apparatus 200 according to an exemplary embodiment. As shown in FIG. 3, the mobile apparatus 200 includes a communication unit 210, an image processing unit 220, an output unit 230, and a control unit 240.

The communication unit 210 performs communication with the display apparatus 100. In particular, the communication unit 210 receives an image transport stream from the display apparatus 100.

The image processing unit 220 processes the image transport stream transmitted through the communication unit 210 and outputs the processed result through the output unit 230. Specifically, the image processing unit 220 includes a decoder 221 and a scaler 222. The decoder 221 separates the image transport stream transmitted through the communication unit 210 into additional information data, video data, audio data, and synchronization control information using a demultiplexer (not shown), and performs decoding on the separated audio data and video data. The scaler 222 converts a scale of the separated video data into a size to be displayed on a display screen according to additional information.

The output unit 230 outputs video data and audio data output from the image processing unit 220. Specifically, the output unit 230 displays the scale-designated video data to the display unit (not shown) and the audio data to a speaker (not shown).

The control unit 240 controls an overall operation of the mobile apparatus 200 according to a user command. Specifically, the control unit 240 transmits a signal requesting information about a resolution provided by the display apparatus 100 to the display apparatus 100 through the communication unit 210. Then, when the information about the resolution provided by the display apparatus 100 is received from the display apparatus 100, the control unit 240 requests an image having a resolution reproducible by the mobile apparatus 200 to the display apparatus 100. For example, when an image having the resolution provided by the display apparatus 100 is a 480 P-graded SD image, a 720 P-graded HD image, and a 1080 P-graded HD image, and the highest resolution reproducible by the mobile apparatus 200 is the 720 P-graded HD image, the control unit 240 requests the 720 P-graded HD image having the highest resolution among resolutions (for example, the 480 P-graded SD image and the 720 P-graded HD image) reproducible by the mobile apparatus 200 to the display apparatus 100.

At this time, the control unit 240 may determine the reproducible resolution of the image of the mobile apparatus 200 according to the hardware (for example, the resolution to be supportable by the display unit) and/or the software (for example, the resolution to be supportable by a player configured to reproduce an image) of the mobile apparatus 200, as well as conditions of the mobile environment (for example, a transmission rate).

When an image transport steam having a specific resolution (for example, a 720 P-graded HD image) is transmitted from the display apparatus 100, the control unit 240 processes the transmitted image transport stream through the image processing unit 220 and outputs the processed result through the output unit 230.

In addition, when a resolution of an image to be transmitted is changed due to the additional or withdrawal of another mobile apparatus while the image having the first resolution is being transmitted from the display apparatus 100, the control unit 240 may process the image having the changed resolution and output the processed image.

For example, when the transmitted image having the resolution is changed into a 720 P-graded HD image due to the addition or withdrawal of another mobile apparatus while the 480 P-graded SD image is transmitted from the display apparatus 100, the control unit 240 may process the transmitted image through the image processing unit 220 with the 720 P-graded HD image and output the processed image.

Accordingly, the above-described mobile apparatus 200, enables the users of the mobile apparatus 200 to view the image transmitted from the display apparatus.

Hereinafter, a method of providing an image to a plurality of mobile apparatuses will be described with reference to FIGS. 4 and 5. FIG. 4 is a flowchart illustrating a method of providing an image of the display apparatus 100 according to an exemplary embodiment.

The display apparatus 100 receives signals requesting images of different and/or same resolutions from a plurality of mobile apparatuses (S410). Specifically, when a signal requesting information about a resolution supportable by the display apparatus 100 is received from the plurality of mobile apparatuses, the display apparatus 100 transmits the information about the resolution supportable by the display apparatus 100 to the plurality of mobile apparatuses. In addition, the display apparatus 100 may receive the signals requesting the images having different or same resolutions from the plurality of mobile apparatuses.

The display apparatus 100 determines a resolution reproducible by all the plurality of mobile apparatuses among resolutions requested from the plurality of mobile apparatuses (S420). For example, the resolution reproducible by the plurality of mobile apparatuses may be the lowest resolution among the resolutions requested from the plurality of mobile apparatuses.

Then, the display apparatus 100 performs signal processing on the image to be transmitted to the plurality of mobile apparatuses (S430). For example, the display apparatus 100 decodes the image to be transmitted to the plurality of mobile apparatuses, designates a scale corresponding to the resolution of the image to be transmitted to the plurality of mobile apparatuses and inserts additional information included in the information about the resolution of the image to be transmitted to the plurality of mobile apparatuses into the designated result to generate a transport stream.

Then, the display apparatus 100 transmits the processed image to the plurality of mobile apparatuses (S440). Particularly, the display apparatus 100 may transmit the image transport stream having specific resolution information to the plurality of mobile apparatuses.

FIG. 5 is a flowchart illustrating a method of providing an image of the image providing system 10 according to an exemplary embodiment.

The first mobile apparatus 200-1 transmits a signal requesting information about a resolution to the display apparatus 100 (S501). The display apparatus 100 transmits information about the resolution supportable by the display apparatus 100 to the first mobile apparatus 200-1 (S502). At this time, an image corresponding to the resolution supportable by the display apparatus 100 may be a 480 P-graded SD image, a 720 P-graded HD image, and a 1080-graded HD image.

The first mobile display 200-1 transmits a signal requesting an HD image to the display apparatus 100 (S503). When the signal requesting the HD image is received by the display apparatus 100, the display apparatus 100 processes the image to be transmitted to the first mobile apparatus 200-1 with the HD-graded image (S504).

Then, the display apparatus 100 transmits the processed HD image to the first mobile apparatus 200-1 (S505). When the HD image is transmitted, the first mobile apparatus 200-1 processes the transmitted HD image and reproduces the processed HD image (S506).

Then, the second mobile device 200-2 transmits a signal requesting information about the resolution supportable by the display apparatus 100 to the display apparatus 100 (S507). The display apparatus 100 transmits information about the resolution supportable by the display apparatus 100 to the second mobile apparatus 200-2 (S508). At this time, an image corresponding to the resolution supportable by the display apparatus 100 may be a 480 P-graded SD image, a 720 P-graded HD image, and a 1080 P-graded HD image.

The second mobile apparatus 200-2 transmits the signal requesting the SD image to the display apparatus 100 (S509). When the signal requesting the SD image is received by the display apparatus 100, the display apparatus 100 processes the image to be transmitted to the first mobile apparatus 200-1 and the second mobile apparatus 200-2 with an SD-graded image (S510).

Then, the display apparatus 100 transmits the image processed with the SD grade to the first mobile apparatus 200-1 and to the second mobile apparatus 200-2 (S511, S512).

When the image processed with the SD grade is transmitted, the first mobile apparatus 200-1 changes and processes the image which is being reproduced with the HD grade into an SD-graded image, and reproduces the SD-grade image (S514).

Then, the third mobile apparatus 200-3 transmits a signal requesting information about the resolution supportable by the display apparatus 100 to the display apparatus 100 (S515). The display apparatus 100 transmits information about the resolution supportable by the display apparatus 100 to the third mobile apparatus 200-3 (S516). At this time, the image corresponding to the resolution supportable by the display apparatus 100 may be a 480 P-graded SD image, a 720 P-graded HD image, and a 1080 P-graded HD image.

The third mobile apparatus 200-3 transmits a signal requesting an HD image to the display apparatus 100 (S517).

Although the display apparatus 100 receives the signal requesting the HD image, the display apparatus 100 continues to processes the image to be transmitted to the first through third mobile apparatuses 200-1, 200-2, and 200-3 with the SD grade. This is because the second mobile apparatus 200-2 is not enabled to reproduce the HD-graded image and thus it causes the image to be watched through all the mobile apparatuses 200-1, 200-2, and 200-3 to be the SD-graded image.

Then, the display apparatus 100 transmits the image processed with the SD grade to the third mobile apparatus 200-3 (S518). The third mobile apparatus 200-3 processes the transmitted image with the SD grade and reproduces the SD image (S519).

Next, the second mobile apparatus 200-2 transmits a signal for interruption of the transmitting of the image to the display apparatus 100 (S520). When the signal requesting the interruption of the transmitting of the image is received by the display apparatus 100, the display apparatus 100 interrupts the transmitting of the SD image which is being transmitted to the second mobile apparatus 200-2 (S521).

The display apparatus 100 processes the image to be transmitted to the first mobile apparatus 200-1 and to the third mobile apparatus 200-3 with the HD grade (S522). This is because the resolution is changed into the lowest resolution among the resolutions requested by the plurality of remaining mobile apparatuses due to the withdrawal of the second mobile apparatus 200-2.

Then, the display apparatus 100 transmits the HD image to the first mobile apparatus 200-1 and to the third mobile apparatus 200-3 (SS523, S524). When the HD image is transmitted, the first and third mobile apparatuses 200-1 and 200-3 change and process the image which was reproduced with the SD grade into an image with the HD grade and reproduces the processed HD image (S525, S526).

Through the methods of providing an image according to the above-described exemplary embodiments, the mobile apparatus users are capable of watching the image provided from one display apparatus at their mobile apparatus.

Meanwhile, the above-described exemplary embodiment have described a display apparatus which receives signals requesting images of different resolutions from the plurality of mobile apparatuses, determines a first resolution which is to be reproducible by all of the plurality of mobile apparatuses among the resolutions requested from the plurality of mobile apparatuses, processes the image to be transmitted to the plurality of mobile apparatuses with the first resolution, and transmits the image having the first resolution to the plurality of mobile apparatuses, but the exemplary embodiments are only an example and functions of the mobile apparatus and display apparatus may be exchanged.

For example, when a signal requesting an image having the first resolution is received from a first display apparatus, the mobile apparatus processes the image to be provided to the first display apparatus with the first resolution and transmits the processed image with the first resolution to the first display apparatus. When a signal requesting a signal having a second resolution lower than the first resolution is received from a second display apparatus, the mobile apparatus processes the image to be displayed to the first and second display apparatuses with the second resolution. Then, the mobile apparatus may transmit the image processed with the second resolution to the first and second display apparatuses.

When a signal requesting an image having the first resolution is received by the mobile apparatus from a third display apparatus, the mobile apparatus may transmit the image processed with the second resolution to the first through third display apparatuses.

In addition, the above-described exemplary embodiments have described that that the resolution supported by the display apparatus as 480 P, 720 P, and 1080 P, but the exemplary embodiments are not limited thereto, and thus the inventive concept may be applied to other resolutions.

A program code for executing the methods of providing an image according to the above-described exemplary embodiments may be stored in various recording media. Specifically, the program code may be stored in various types of recording media readable by a terminal such as a random access memory (RAM), a flash memory, a read only memory (ROM), an erasable programmable ROM (EPROM), an electronically erasable and programmable ROM (EEPROM), a register, a hard disc, a removable disc, a memory card, a universal serial bus (USB) memory, a compact disc ROM (CD-ROM).

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of providing an image displayed by a display apparatus, the method comprising:
   receiving signals requesting images having different resolutions from each other from a plurality of mobile apparatuses;
   determining a first resolution reproducible by all of the plurality of mobile apparatuses among a plurality of resolutions requested from the plurality of mobile apparatuses and processing the image to be provided to the plurality of mobile apparatuses with the first resolution; and
   transmitting the image having the first resolution to the plurality of mobile apparatuses.

2. The method as claimed in claim 1, further comprising:
   receiving a signal requesting the image having a second resolution from an additional mobile apparatus other than the plurality of mobile apparatuses;
   processing the image to be provided to the plurality of mobile apparatuses and to the additional mobile apparatus with the second resolution when the first resolution is higher than the second resolution; and
   transmitting the image having the second resolution to the plurality of mobile apparatuses and to the additional mobile apparatus.

3. The method as claimed in claim 2, further comprising:
   processing the image to be provided to the plurality of mobile apparatuses and to the additional apparatus with the first resolution when the first resolution is lower than the second resolution; and
   transmitting the image having the first resolution to the plurality of mobile apparatuses and to the additional mobile apparatus.

4. The method as claimed in claim 1, further comprising:
   receiving a signal requesting interruption of the transmitting of the image from one of the plurality of mobile apparatuses;
   processing the image to be provided to remaining ones among the plurality of mobile apparatuses other than the one of the plurality of mobile apparatus with a third resolution when the lowest resolution among resolutions requested from the remaining ones among the plurality of mobile apparatuses other than the one of the plurality of mobile apparatus is changed into the third resolution; and transmitting the image having the third resolution to the remaining ones among the plurality of mobile apparatuses other than the one of the plurality of mobile apparatuses.

5. The method as claimed in claim 1, wherein the processing includes:
designating scaling video data constituting the image to be provided to the plurality of mobile apparatuses according to the first resolution; and
compressing the video data and audio data constituting the image to be provided to the plurality of mobile apparatuses and inserting information about the first resolution into additional information to generate a transport stream.

6. The method as claimed in claim 1, further comprising storing information about different resolutions from each other requested from the plurality of mobile apparatuses in a resolution list.

7. The method as claimed in claim 1, wherein the receiving includes:
receiving a signal requesting information about resolutions provided by the display apparatus from the plurality of mobile apparatuses;
transmitting the information about the resolutions provided by the display apparatus to the plurality of mobile apparatuses; and
receiving a signal requesting the image having one resolution among the resolutions from each of the plurality of mobile apparatuses.

8. An image streaming apparatus comprising:
a communication unit configured to communicate with a plurality of mobile apparatuses;
an image processing unit configured to process an image to be transmitted to the plurality of mobile apparatuses;
a control unit configured to, when signals requesting images having different resolutions from each other are received from the plurality of mobile apparatuses, determine a first resolution reproducible by all of the plurality of mobile apparatuses among a plurality of resolutions requested from the plurality of mobile apparatuses, process the image to be transmitted to the plurality of mobile apparatuses with the first resolution, and control the communication unit to transmit the image having the first resolution to the plurality of mobile apparatuses.

9. The image streaming apparatus as claimed in claim 8, wherein the control unit compares the first resolution with a second resolution when a signal requesting the image having the second resolution is received from an additional mobile apparatus other than the plurality of mobile apparatuses, processes the image to be provided to the plurality of mobile apparatuses and the additional mobile apparatus with the second resolution when the first resolution is higher than the second resolution, and controls the communication unit to transmit the image having the second resolution to the plurality of mobile apparatuses and the additional mobile apparatus.

10. The image streaming apparatus as claimed in claim 9, wherein the control unit processes the image to be provided to the plurality of mobile apparatuses and the additional mobile apparatus with the first resolution when the first resolution is lower than the second resolution, and controls the communication unit to transmit the image having the first resolution to the plurality of mobile apparatuses and the additional mobile apparatus.

11. The image streaming apparatus as claimed in claim 8, wherein, when a signal for interruption of the transmission of the image is received from one of the plurality of mobile apparatuses, and the lowest resolution among resolutions requested by remaining ones of the plurality of mobile apparatuses other than the one mobile apparatus is changed into a third resolution, the control unit processes the image to be provided to the remaining ones of the plurality of mobile apparatuses other than the one mobile apparatus, and controls the communication unit to transmit the image having the third resolution to the remaining ones of the plurality of mobile apparatuses other than the one mobile apparatus.

12. The image streaming apparatus as claimed in claim 8, wherein the image processing unit includes:
a scaler configured to scale video data constituting the image to be transmitted to the plurality of mobile apparatuses according to the first resolution; and
an encoding unit configured to compress the video data and audio data constituting the image to be transmitted to the plurality of mobile apparatuses, and insert information of the first resolution into additional information to generate a transport stream.

13. The image streaming apparatus as claimed in claim 8, further comprising a storage unit configured to store information of the different resolutions requested from the plurality of mobile apparatuses as a resolution list.

14. The image streaming apparatus as claimed in claim 8, wherein the image streaming apparatus is disposed in a display apparatus.

15. The image streaming apparatus as claimed in claim 14, wherein, when a signal requesting information of resolutions provided by the display apparatus is received from the plurality of mobile apparatuses, the communication unit transmits the information of the resolutions provided by the display apparatus to the plurality of mobile apparatuses, and
receives a signal requesting the image having one resolution among the resolutions provided by the display apparatus from each of the plurality of mobile apparatuses.

16. A method of providing an image displayed by a display apparatus, the method comprising:
receiving a first signal requesting an image having a first resolution from a first mobile apparatus;
processing the image to be transmitted to the first mobile apparatus with the first resolution;
transmitting the image processed with the first resolution to the first mobile apparatus;
receiving a second signal requesting the image having a second resolution lower than the first resolution from a second mobile apparatus;
processing the image to be transmitted to the first mobile apparatus and the second mobile apparatus with the second resolution; and
transmitting the image processed with the second resolution to the first mobile apparatus and to the second mobile apparatus.

17. The method as claimed in claim 16, further comprising:
receiving a third signal requesting the image having the first resolution from a third mobile apparatus; and
transmitting the image processed with the second resolution to the first mobile apparatus, the second mobile apparatus, and the third mobile apparatus.

18. The method as claimed in claim 17, further comprising:
interrupting the transmitting of the image processed with the second resolution to the second mobile apparatus when a signal for interrupting the transmitting of the image is provided from the second mobile apparatus;

processing the image to be provided to the first mobile apparatus and the third apparatus with the first resolution; and transmitting the image processed with the first resolution to the first mobile apparatus and the second mobile apparatus.

19. The method as claimed in claim 16, further comprising:
mapping the first mobile apparatus with the first resolution and storing the mapping result; and
mapping the second mobile apparatus with the second resolution and storing the mapping result.

20. A method of providing an image of a mobile apparatus, the method comprising:
receiving a signal requesting an image having a first resolution from a first display apparatus;
processing the image to be transmitted to the first display apparatus with the first resolution;
transmitting the image processed with the first resolution to the first display apparatus;
receiving a signal requesting the image having a second resolution lower than the first resolution from a second display apparatus;
processing the image to be provided to a first mobile apparatus and the second display apparatus with the second resolution; and
transmitting the image processed with the second resolution to the first display apparatus and to the second display apparatus.

21. The method as claimed in claim 20, further comprising:
receiving another signal requesting the image having the first resolution from a third display apparatus; and
transmitting the image processed with the second resolution to the first display apparatus, the second display apparatus, and the third display apparatus.

22. A method of providing an image displayed on a display apparatus, the method comprising:
receiving signals requesting information of resolutions supported by the display apparatus from a plurality of mobile apparatuses;
transmitting information of the resolutions supported by the display apparatus to the plurality of mobile apparatuses;
receiving signals requesting transmission of the image displayed on the display apparatus from the plurality of mobile apparatuses according to a reproducible resolution of each of the plurality of mobile apparatuses and the resolutions supported by the display apparatus;
determining a common reproducible resolution by all of the plurality of mobile apparatuses and processing the image to be provided to all of the plurality of mobile apparatuses according to the common reproducible resolution; and
transmitting the image with the common reproducible resolution to all of the plurality of mobile apparatuses.

23. An image streaming apparatus comprising:
a communication unit configured to receive signals requesting information of resolutions supported by a display apparatus from a plurality of mobile apparatuses, transmit information of the resolutions supported by the display apparatus to the plurality of mobile apparatuses and to receive signals requesting transmission of an image displayed on the display apparatus from the plurality of mobile apparatuses according to a reproducible resolution of each of the plurality of mobile apparatuses and the resolutions supported by the display apparatus;
a control unit configured to determine a common reproducible resolution by all of the plurality of mobile apparatuses; and
an image processing unit configured to process the image to be provided to all of the plurality of mobile apparatuses according to the common reproducible resolution,
wherein the control unit transmits the image with the common reproducible resolution to all of the plurality of mobile apparatuses.

* * * * *